United States Patent
Bekkers et al.

(10) Patent No.: US 12,297,409 B2
(45) Date of Patent: May 13, 2025

(54) FOAM STABILITY

(71) Applicant: Heineken Supply Chain B.V., Amsterdam (NL)

(72) Inventors: Augustinus Cornelius Aldegonde Petrus Albert Bekkers, Bunnik (NL); Eric Richard Brouwer, Alphen aan den Rijn (NL)

(73) Assignee: Heineken Supply Chain B.V., Amsterdam (NL)

( * ) Notice: Subject to any disclaimer, the term of this patent is extended or adjusted under 35 U.S.C. 154(b) by 577 days.

(21) Appl. No.: 17/265,593

(22) PCT Filed: Sep. 10, 2018

(86) PCT No.: PCT/NL2018/050588
§ 371 (c)(1),
(2) Date: Feb. 3, 2021

(87) PCT Pub. No.: WO2020/055235
PCT Pub. Date: Mar. 19, 2020

(65) Prior Publication Data
US 2021/0309950 A1   Oct. 7, 2021

(51) Int. Cl.
*C12C 11/11* (2019.01)
*B01J 20/26* (2006.01)
*C12C 7/14* (2006.01)
*C12C 11/00* (2006.01)
*C12C 12/04* (2006.01)

(52) U.S. Cl.
CPC ............. *C12C 11/11* (2013.01); *B01J 20/26* (2013.01); *C12C 7/14* (2013.01); *C12C 11/003* (2013.01); *C12C 12/04* (2013.01)

(58) Field of Classification Search
CPC .. B01J 20/26; C12C 11/11; C12C 7/14; C12C 11/003; C12H 1/042
See application file for complete search history.

(56) References Cited

U.S. PATENT DOCUMENTS

| | | |
|---|---|---|
| 5,387,425 A | 2/1995 | Hsu et al. |
| 5,762,991 A | 6/1998 | Dziondziak et al. |
| 5,993,865 A | 11/1999 | Bech et al. |
| 6,162,360 A | 12/2000 | Ho et al. |
| 9,238,788 B2 | 1/2016 | Alarcon Camacho et al. |

(Continued)

FOREIGN PATENT DOCUMENTS

| | | |
|---|---|---|
| AU | 2013382720 A1 | 9/2015 |
| BY | 5379 C1 | 9/2003 |

(Continued)

OTHER PUBLICATIONS

Mangindaan et al., "Beverage dealcoholization processes: Past, present, and future," Trends in Food Science & Technology 71, 2018, pp. 36-45, 10 pages.

(Continued)

*Primary Examiner* — Vera Stulii
(74) *Attorney, Agent, or Firm* — Banner & Witcoff, Ltd.

(57) ABSTRACT

The present invention is directed to a beer having reduced quantities of AcHFA. It has been found that beer with reduced AcHFA quantities has improved foam stability. The invention provides beer with reduced AcHFA quantities, as well as methods for removing AcHFA from beer during or after fermentation, or for removing a precursor for AcHFA from wort.

20 Claims, 7 Drawing Sheets

(56) References Cited

U.S. PATENT DOCUMENTS

| | | |
|---|---|---|
| 9,580,675 B2 | 2/2017 | Saerens et al. |
| 2005/0163884 A1 | 7/2005 | Shah et al. |

FOREIGN PATENT DOCUMENTS

| | | |
|---|---|---|
| CA | 2127440 A1 | 8/1993 |
| CO | 2021000093 A2 | 4/2021 |
| CO | 2021003706 A2 | 4/2021 |
| CO | 2021003796 A2 | 4/2021 |
| CO | 2021004257 A2 | 4/2021 |
| EP | 0101254 A2 | 2/1984 |
| EP | 2266421 A1 | 12/2010 |
| EP | 2385100 A1 | 11/2011 |
| EP | 3088507 A1 | 11/2016 |
| FR | 1122387 A | 9/1956 |
| GB | 1121017 A | 7/1968 |
| GB | 1376306 | 12/1974 |
| JP | 01165363 A | 6/1989 |
| JP | 866176 A | 12/1996 |
| JP | 2002365277 A | 12/2002 |
| JP | 2003169658 A | 6/2003 |
| JP | 2004290072 A | 10/2004 |
| JP | 2007252276 A | 10/2007 |
| JP | 4542989 B2 | 9/2010 |
| JP | 2012125205 A | 7/2012 |
| JP | 2015112088 A | 6/2015 |
| JP | 2015112090 A | 6/2015 |
| JP | 2017023124 A | 2/2017 |
| JP | 2019024469 A | 2/2019 |
| JP | 2022512543 A | 2/2022 |
| RU | 2145974 C1 | 2/2000 |
| WO | 9414948 A1 | 7/1994 |
| WO | 9604363 A1 | 2/1996 |
| WO | 9907820 A2 | 2/1999 |
| WO | 2009/133391 A1 | 11/2009 |
| WO | 2014161998 A1 | 10/2014 |
| WO | 2020055233 A1 | 3/2020 |
| WO | 2020055234 A1 | 3/2020 |
| WO | 2020055236 A1 | 3/2020 |

OTHER PUBLICATIONS

Branyik et al., "A review of methods of low alcohol and alcohol-free beer production," Journal of Food Engineering 108, 2012, pp. 493-506, 14 pages.

Judson, "Separation Processes, Second Edition," McGraw-Hill Chemical Engineering Series, 1980, 889 pages.

Gorter De Vries et al., "CRISPR-Cas9 mediated gene deletions in lager yeast *Saccharomyces pastorianus*," Microbial Cell Factories, 2017, 18 pages.

Kirin Research and Development [online], Dec. 2009, Internet. Last accessed: Jun. 5, 2023. URL:https://rd.kirinholdings.com/result/report_010.html.

Jackson, G. "A Technique for Identifying Foam Damage by Lipids." Journal Inst. Brew., vol. 87, pp. 242-243. Jul.-Aug. 1981.

International Search Report & Written Opinion issued in corresponding PCT application No. PCT/NL2018/050588 dated Jul. 1, 2019, 14 pages.

Fritsch et al., "Identification Based on Quantitative Measurements and Aroma Recombination of the Character Impact Odorants in a Bavarian Pilsnergtype Beer," J. Agric. Food Chem., 2005, 8 pages.

Campo et al., "Solid phase extraction, multidimensional gas chromatography mass spectrometry determination of four novel aroma powerful ethyl esters Assessment of their occurrence and importance in wine and other alcoholic beverages," Journal of Chromatography, 2007, 9 pages.

C.W. Bamforth, "The foaming properties of beer", J. Inst. Brew., 1985, vol. 91(6), pp. 370-383.

Kobayashi et al. Behavior of Mono-, Di-, and Trihydroxyoctadecenoic Acids during Mashing and Methods of Controlling Their Production. Journal of Bioscience and Bioengineering vol. 90, No. 1, 69-73, 2000.

FOAM STABILITY

The invention is directed at a beer with improved foam stability, as well as to methods to improve the foam stability of beer.

BACKGROUND

Beer is among the most popular alcoholic beverages worldwide. It is prepared by fermentation of a sugar-containing aqueous matrix derived from grains, using yeast which converts the sugars to ethanol ("alcohol"). The production process of beer is generally known, and the skilled person is capable of obtaining beer based on common general knowledge (see e.g. The Brewers Handbook (second edition) of Ted Goldammer (2008, Apex publishers) and the information disclosed herein.

Beer is commonly made from cereal such as barley, although other cereal types including but not limited to wheat or sorghum may also be used. Beer is commonly produced by a process that comprises the following basic steps: mashing a mixture of grain and water to produce a mash; separating the mash in wort and spent grain; boiling the wort to produce a boiled wort; fermenting the boiled wort with live yeast (such as *Saccharotryces pastorianus* or *Saccharonmyces cererisiae*) to produce a fermented wort; subjecting the fermented wort to one or more further process steps (e.g. maturation and filtration) to produce beer; and packaging the beer in a sealed container, e.g. a bottle, can or keg.

In an exemplary process to produce a barley malt beer, the barley is malted, which means it is germinated and subsequently dried ("kilning"), to produce malt. This process is important for the formation of taste and color compounds, and formation of enzymes which are important for further flavor development and starch degradation. Subsequently, the malt is milled and suspended in water ("mashing"). The mash is heated to facilitate starch degradation. Subsequent filtration results in wort, which is a more or less clarified aqueous solution of fermentable sugars, which also contains various flavors and aromas and many other compounds. In wort, both desirable and undesirable flavor compounds are present.

The wort is boiled to sterilize it, to precipitate proteins, and to concentrate it. Optionally hop is added, to add bitterness and flavor. This mixture, after removal of the precipitate, is subjected to fermentation. Fermentation results in conversion of fermentable sugars in ethanol and carbon dioxide, and also results in formation of various new flavor compounds. At the same time, the yeast used for the fermentation effects many further chemical conversions. After fermentation, the beer may be filtered and/or stored, in order to optimize appearance and taste.

An important aspect of beer is the beer head. The head is a layer of foam on top of the beer. This foam derives from carbon dioxide present in the beer by the fermentation and/or post-fermentation addition, but which is essentially dissolved in the beer as a result of the high pressure in the beer container (e.g. a can or bottle). Releasing the beer from the container into, for example, a glass, causes the formation of carbon dioxide bubbles, which rise through the beer liquid to the top of the glass to form a foam.

A distinguishing feature of beer foam is its stability. In contrast to other foaming yeast-fermented beverages (e.g. champagne), beer foam is stable. This is caused by (among others) proteins and isomerized hop acids in beer, which during the formation and rising of the carbon dioxide bubble through the beer position themselves at the interface of the bubble and the liquid. Upon reaching the top of the liquid, these components stabilize the beer foam bubbles. As a result, the foam layer remains intact for prolonged period of time. An intact and stable foam layer is considered an important aspect of an enjoyable beer.

The foam stabilization is however of limited duration. In a matter of minutes after pouring, the foam layer becomes thinner, and ultimately no foam at all is left. It may happen that this process occurs faster than the consumer is willing to consume the beer. This means that the beer is less enjoyed with time, due to a vanishing foam layer. For slow drinkers, the foam may have disappeared even before finishing the beer.

The present invention provides beers having improved foam stability, and methods to improve the foam stability of beer.

SUMMARY

The present invention is directed to a beer having reduced quantities of AcHFA. It has been found that beer with reduced AcHFA quantities has improved foam stability. The invention provides beer with reduced AcHFA quantities, as well as methods for removing AcHFA from beer during or after fermentation, or for removing a precursor for AcHFA from wort.

FIGURES

FIG. 2: The effect of AcHFA addition on foam stability of hopped (2*a*) and non-hopped (2*b*) beer.

FIG. 3: The effect of AcHFA removal from hopped (3*a*) and non-hopped (3*b*) beer.

DETAILED DESCRIPTION

The invention provides a beer comprising less than 2 mg/l of AcHFA, wherein AcHFA is a C12-C22 fatty acid, comprising a carboxylic acid group and a C11-C21 linear alkyl group, which alkyl group may be partially unsaturated, and which alkyl group is substituted with at least one hydroxy group and at least one acetate group. Preferably, the beer comprises less than 1.5 mg/l AcHFA, preferably less than 1.0 mg/l, more preferably less than 0.5 mg/l, even more preferably less than 0.25 mg/l, even more preferably less than 0.1 mg/l. Thus, the invention pertains to beer comprising certainly less than 10 mg/l, such as less than 9 mg/l, less than 8 mg/l, less than 7 mg/l, less than 6 mg/l, less than 5 mg/l, less than 4 mg/l AcHFA, or less than 3 mg/l/.

It has presently been found that AcHFA forms during regular fermentation of wort by yeast, by the action of the enzyme acetyl transferase (ATF). It has been found normally present in beer obtained by fermentation, at a level of at least 2 mg/l, sometimes at least 3 mg/l, or even at least 4 mg/l, or at least 5 mg/l, or at least 6 mg/l, or at least 7 mg/l, or at least 8 mg/l, or at least 9 mg/l, or at least 10 mg/l. Thus, AcHFA can be present in beer obtained by fermentation in quantities higher than 1 mg/l, certainly higher than 0.5 mg/l, and most certainly higher than 0.25 mg/l. The inventors found that AcHFA is a foam-negative factor: it has a negative effect on foam stability. By adapting the fermentation process to decrease the quantity of AcHFA in the final beer, foam stability can be increased by at least 10%, up to 40%.

AcHFA ("acetylated hydroxy fatty acid") is a C12-C22 fatty acid, comprising a carboxylic acid group and a C11-C21 linear alkyl group, which alkyl group may be partially unsaturated, and which alkyl group is substituted with at least one hydroxy group and at least one acetate group. An acetate group ($HaCCO_2\sim$) is abbreviated (as common in the art) as ~OAc.

AcHFA may be defined as structure 1 wherein n=is an integer ranging from 4-9, and wherein each ⌇, A, B, C and/or D can be the same or different, and wherein either a) ⌇ is a single bond, in which case:
one of A and B is H, OH or OAc, and the other of A and B is H;
one of C and D is H, OH or OAc, and the other of C and D is H; or b) ⌇ is a double bond, in which case:
one of A and B is H while the other of A and B is not present (which means that the other of A and B is nothing), and one of C and D is H while the other of C and D is not present (which means that the other of A and B is nothing):
provided that in structure 1, at least one of all A, B, C, D is OH and at least one of all A, B, C, D is OAc.

As is commonly known, the double bond may have cis or trans configuration, but preferably, the configuration is cis. Furthermore, as is common for organic acids, the acid group may be in neutral form (as depicted; $\sim CO_2H$), but may also be in ionic form ($\sim CO_2-$), or in salt-form (($\sim CO_2)_xM$, wherein M can be any metal ion, and preferably a metal ion available in beer, such as for example an ion of Na, K, Ca, Mg, Fe, Cu, Zn or Mn, and wherein x=1 if M is monovalent (Na or K), and wherein x can be 1, 2 or 3 for higher valency ions. Carbon atoms bearing OH or OAc may independently have R or S configuration, but preferably, adjacent carbon atoms bearing an OH and an OAc group both have R-configuration, or both have S configuration (RR and SS). Alternatively, one carbon atom of adjacent carbon atoms bearing an OH and an OAc group has an S configuration, and the other carbon of the two adjacent carbon atoms has an R configuration (RS or SR).

Preferably, AcHFA comprises one hydroxy group and one acetate group which are located on adjacent carbon atoms, among the optionally multiple hydroxy and/or acetate groups. Further preferably, AcHFA is a C16-C20 fatty acid (n=6-8 in structure 1), most preferably a C18 fatty acid (n=7 in structure 1). It is much preferred if AcHFA comprises 1 or 2 double bonds, preferably one double bond. Double bonds are preferably located on the $6^{th}$, $9^{th}$, $12^{th}$ or $15^{th}$ carbon atom, counting from the carboxylic acid group. Most preferably, a double bond is located on the 9th carbon atom.

In much preferred embodiments, AcHFA is represented by structure 2:

wherein
n=1, 2, or 3, preferably 2 or 3, most preferably 3;
m=1 or 2, preferably 2;
one of A and B is OH, and the other of A and B is OAc.
Also for structure 2, the double bond may have cis or trans configuration (depicted by the line format ⌇, which indicates that the orientation of a carbon-carbon single bond which extends from a carbon-carbon double bond can be in any direction), but preferably, the configuration is cis. The acid group in structure 2 may be in neutral form, as depicted, but may also be in ionic form or salt form, as defined above.

In much preferred embodiments, AcHFA is represented by structure 3:

wherein one of A and B is OH, and the other of A and B is OAc. In these embodiments, AcHFA is (cis or trans; RR, SS, RS or SR) 12-acetoxy-13-hydroxyoctadec-9-enoic acid (3a), or (cis or trans; RR, SS, RS or SR) 13-acetoxy-12-hydroxyoctadec-9-enoic acid (3b):

It has been found that AcHFA naturally occurs in beer, because it is formed during fermentation by the yeast enzyme acetyl transferase (ATF).

An AcHFA precursor is a dihydroxy fatty acid, such as for example structures 1-3 defined above, wherein the AcHFA precursor has an OH-group on each location where there is an OAc-group in AcHFA. The yeast ATF enzymes acetylate (at least) one OH-group, to convert the AcHFA precursor into AcHFA.

It has furthermore been found that beer with reduced AcHFA content, relative to the same regular beer, has improved foaming properties. In particular, reduction of the quantity of AcHFA increases the stability of beer foam.

The stability of beer foam, in the present context, is measured according to the standards set by NIBEM Institute, and expressed in seconds ([s]). Thus, beer foam stability indicates the amount of time in seconds that the foam layer is stable under standardized test conditions.

The NIBEM methodology is generally known, and can be found as EBC method of analysis 9.42.1. The test is performed at 20° C. at atmospheric pressure. Foam stability is measured as the time which passes between preparing the foam under standardized conditions (including a period in which the foam is allowed to drain), until the foam layer is has decreased 3 cm in height.

Beer may refer to any type of beer, including but not limited to ale, porter, stout, lager and bock beer. Beer is preferably a malt-based beer, that is, a beer prepared from the fermentation of wort prepared from malt. Preferably, beer is lager beer, which is a beer obtained by fermentation at 7-15° C. using a bottom-fermenting yeast, and subsequent lagering at low temperature. Lager beer includes for example pilsner. Most preferably, a beer as described herein is a pilsner. A pilsner is a pale lager beer.

In the present context, beer is to be understood in a broad sense, and includes both regular (alcohol-containing) beer and low- or zero alcohol ("NA") beer. Thus, beer in the present context preferably is beer having an ethanol content of 0-15 vol. % ("ABV"), preferably 1-15 vol. %. Beer may be enriched with hop ("hopped beer"), or it may not have been hopped ("unhopped beer"). Hopped beer includes beer that has been prepared using modified hop, such as Rho-hop.

In one preferred embodiment, the beer is a regular beer. "Regular beer", in this context, is regularly brewed beer, obtained using a fermentation process which results in more than 1 vol. % ethanol. Thus, regular beer, as herein defined, has an ethanol content of more than 1 vol. %, and preferably less than 15 vol. %. The ethanol content of a regular beer is preferably 2-15 vol. %, more preferably 2.5-12 vol. %, more preferably 3.5-9 vol. %. The regular beer is preferably a lager beer, as described above, most preferably a pilsner. The skilled person is capable of obtaining regular beer, among which regular lager beer and pilsner, for instance by the methods described in The Brewers Handbook (second edition) of Ted Goldammer (2008, Apex publishers), or by the methods disclosed herein. Alternatively, regular beer can be obtained commercially.

In another preferred embodiment, the beer is a zero- or low alcohol beer ("NA beer"). In the present text, "zero or low alcohol beer" is a beer having an ethanol content of 1.0 vol. % ("ABV") or less, preferably 0.5 vol. % or less, more preferably 0.2 vol. % or less. Thus, NA beer is a beer having an ethanol content of 0-1.0 vol. %, such as preferably 0-0.5 vol. %.

An NA beer can be obtained for example by de-alcoholisation of regular beer (a "de-alcoholised beer"), or by restricted ethanol fermentation of wort (a "restricted-fermentation beer").

One method to obtain an NA beer as herein defined is to subject a regularly brewed beer to a de-alcoholisation step, such as for example a rectification step, a reverse osmosis step, a dialysis step or a freeze concentration step, to remove ethanol from the fermented beer. These techniques are for instance described in Branyik et al, J. Food. Eng. 108 (2012) 493-506, or in Mangindaan et al, Trends in Food Science & Technology 71 (2018) 36-45.

Another method to obtain NA beer is to make beer by a restricted-fermentation process, which gives a restricted-fermentation beer. A restricted-fermentation beer is another type of NA beer as herein defined.

A restricted-fermentation beer is defined as a fermented beer which has been obtained by restricted ethanol fermentation of wort. Restricted ethanol fermentation of wort is fermentation which does not result in significant net ethanol formation, that is, restricted fermentation as defined herein results in 1 vol. % or less, preferably 0.5 vol. % or less ethanol, more preferably 0.2 vol. % or less. A restricted-fermentation beer thus has an ethanol content of 1.0 vol. % or less, preferably 0.5 vol. % or less, more preferably 0.2 vol. % or less.

Restricted fermentation of wort is a process in which the product directly obtained from the fermentation has an ethanol content of 1.0 vol. % or less, preferably 0.5 vol. % or less, more preferably 0.2 vol. % or less. The skilled person is aware of various restricted fermentation techniques which do not result in significant net ethanol formation. Examples are restricted ethanol fermentation of wort characterized by

- a temperature below 7° C., preferably −1-4° C., such as −0.5-2.5° C., preferably for a period of 8-72 hours, more preferably 12-48 hrs ("cold contact fermented beer"); and/or
- a short (e.g. less than 2 hours) fermentation time, which fermentation stopped quickly by temperature inactivation, such as by rapid cooling to −0.5-1° C., optionally followed by subsequent pasteurization ("arrested fermentation beer"); and/or
- fermentation by a yeast strain which produces low quantities of ethanol under the applied fermentation conditions, such as for example a yeast strain which produces less than 0.2 g ethanol per gram fermentable sugar in the wort, preferably less than 0.1 g ethanol per gram fermentable sugar. Suitable strains (e.g. Crabtree negative strains) are known in the art, and the quantity of ethanol produced under varying fermentation conditions can be determined by routine experiments ("yeast-restricted beer"); and/or
- fermentation using a first, ethanol-producing yeast strain, in the presence of a sufficient quantity of a second yeast strain which consumes ethanol, such as *Saccharomyces rouxii*, to consume substantially all ethanol produced by the first yeast strain; and/or
- wort having a content of fermentable sugars such that max 1.0 vol. % of alcohol is produced after completion of its fermentation. In this case, the wort generally has a content of fermentable sugars of less than 17.5 g/l, preferably less than 12 g/l, more preferably less than 8 g/l ("sugar-deprived wort beer").

A restricted-fermentation beer has not been subjected to a de-alcoholisation step to attain the said ethanol content of 1.0 vol. % or less, preferably 0.5 vol. % or less, more preferably 0.2 vol. % or less. The skilled person knows various suitable techniques for de-alcoholisation of a fermented beer (see above, with reference to Branyik et al and Mangindaan et al), and none of these techniques has been applied to attain the said ethanol content. A restricted-fermentation beer in the present context, may however optionally be subjected to a de-alcoholisation step to reduce the ethanol content from the said 1.0 vol. % or less, preferably 0.5 vol. % or less, more preferably 0.2 vol. % or less, as obtained from the fermentation, to a further reduced ethanol content. Preferably however, a restricted-fermentation beer as defined herein has not been subjected to a de-alcoholisation step at all.

A restricted-fermentation beer in the present context is preferably a sugar-deprived wort beer, a yeast-restricted beer, an arrested fermentation beer, or a cold contact fermented beer. A restricted-fermentation beer in the present context is preferably a cold contact fermented beer.

In much preferred embodiments, a beer in the present context is a regular beer, a restricted-fermentation beer, or a mixture of the two types of beer, preferably a regular beer, a cold-contact fermented beer, or a mixture of the two types of beer. Most preferably, in the present context, the beer is regular beer, having an ethanol content of 1-15 vol. % as defined above.

In order to optimally benefit from the increased foam stability, a beer of the invention preferably has a low sugar content. The total sugar content of a beer of the invention, defined as the total of glucose, fructose, sucrose, maltose, and maltotriose, is preferably 0.05-5 g/100 ml, more preferably 0.1-1 g/100 ml, even more preferably 0.15-0.5 g/100 ml. This is because it has been found that in beer with relatively low total sugar content, the foam stabilizing effect of reduced AcHFA quantities is stronger.

For similar reasons, a beer of the invention preferably has relatively high levels of free amino nitrogen (FAN). FAN contributes to foam stability, and beer of the invention thus preferably has a FAN content of 50-160 mg/l, preferably 90-140, more preferably 110-135 mg/l.

Iso-alpha-acids, also, have a positive effect on beer foam stability. Thus, a beer of the invention preferably has a total of iso-alpha-acids of 2-55 mg/l, preferably 5-45 mg/l, more preferably 10-30 mg/l, more preferably 13-25 mg/l. Iso-alpha-acids, in this context, are defined as the soft resin fraction of lupulin, which is produced in female hop cones. Alpha-acids include for example include humulone, cohumulone, and adhumulone.

In order to obtain beer with a reduced quantity of AcHFA as herein defined, three options are disclosed: removal of AcHFA from the beer during or after fermentation, avoiding formation of AcHFA by using an ATF deficient yeast for the fermentation, and removal of an AcHFA precursor from the mixture to be fermented. Thus, the invention discloses a method for increasing the foam stability of beer, comprising a step of fermenting wort to obtain the said beer, wherein
  a) the fermentation is achieved using an acetyl transferase (ATF) deficient yeast; and/or
  b) the beer is contacted with an adsorbent capable of adsorbing AcHFA during or after fermentation; and/or
  c) the wort has been subjected to a step of removal of an AcHFA precursor by an adsorbent capable of adsorbing the AcHFA precursor.

ATF-Deficient Yeast

In one preferred embodiment, the fermentation is achieved using an acetyl transferase (ATF) deficient yeast (including any orthologue of ATF), which yeast is preferably *S. cererisiae*. Such yeast can be obtained by genetic modification of yeast (preferably *S. cererisiae*), such as by replacement or disruption of the ATF encoding genes (knock-out). An ATF-deficient yeast, in the present context, means that in yeast types where multiple copies of an ATF gene exist, preferably all copies of that ATF-gene are knocked out.

There are two genes associated with acetyl transferase activity: ATF-1 and ATF-2 (in *S. cererisae*). The ATF-1 gene has gene identification number 854559 (NCBI database), and the ATF-2 gene has gene identification number 853088 (NCBI database). In other yeast types suitable for fermentation, orthologue ATF-genes can be located using common general knowledge. As mentioned, in an ATF-1 deficient yeast, preferably all copies of the ATF-1 gene are knocked out. In an ATF-2 deficient yeast, preferably all copies of the ATF-2 gene are knocked out.

In one embodiment, the ATF deficient yeast is an ATF-1 deficient yeast. ATF-1 deficiency results in about 50-90%, preferably about 65-85% reduction in AcHFA formation. In another embodiment, the ATF deficient yeast is an ATF-2 deficient yeast. ATF-2 deficiency results in about 1-40, preferably about 10-30% reduction in AcHFA formation. In preferred embodiments the ATF deficient yeast is at least ATF-1 deficient, and preferably also ATF-2 deficient. In much preferred embodiments, the ATF deficient yeast is both an ATF-1 and ATF-2 deficient yeast. Use of a yeast which is deficient both in ATF-1 and in ATF-2 results in full prevention of formation of AcHFA during fermentation.

An ATF-deficient yeast can be obtained by commonly known methods, such as by mutagenesis, preferably random mutagenesis, or by genetic engineering.

"Mutagenesis" as used herein refers to a process whereby at least one mutation is generated in the DNA of at least one yeast cell or spore thereof so that the genetic information of the yeast cell(s) or spore(s) is changed. Thus, mutagenesis can result in an ATF-deficient yeast as described above.

As used herein, the term "mutation" refers to any change in the DNA of yeast cell or spore and includes, but is not limited to, point mutation, insertion or deletion of one or more nucleotides, substitution of one or more nucleotides, frameshift mutation and single stranded or doubled stranded DNA break, such as a chromosome break or subtelomeric break, and any combination thereof. Preferably, the mutation is located in an ATF gene, so as to result in an ATF-deficient yeast as described above.

Mutagenesis can be performed using any method known in the art, including conventional random mutagenesis methods, such as radiation and chemical treatment, and recombinant DNA technologies, such as site-directed mutagenesis or targeted mutagenesis. Hence, in one embodiment, the at least one yeast cell or spore of at least the first species of yeast is subjected to treatment with UV irradiation, X-ray irradiation, gamma-ray irradiation or a mutagenic agent or to genetic engineering.

"Genetic engineering" is well known in the art and refers to altering the yeast cell's or spore's genome using biotechnology, thereby introducing an alteration of the DNA of a yeast cell or spore.

"Random mutagenesis" refers to mutagenesis techniques whereby the exact site of mutation is not predictable, and can occur anywhere in the chromosome of the yeast cell(s) or spore (s). In general, these methods involve the use of chemical agents or radiation for inducing at least one mutation. Random mutagenesis can further be achieved using error prone PCR wherein PCR is performed under conditions where the copying accuracy of the DNA polymerase is low, resulting in a relatively high rate of mutations in the PCR product. Site-directed mutagenesis can be achieved using oligonucleotide-directed mutagenesis to generate site-specific mutations in a DNA sequence of interest. Targeted mutagenesis refers to mutagenesis methods that alter a specific or targeted gene in vivo resulting in a change in the genetic structure directed at a specific site, such as by programmable RNA-guided nucleases, such as TALEN, CRISPR-Cas, zinc finger nuclease or meganuclease technology.

In a preferred embodiment, mutagenesis is performed in the method of the invention by subjecting the at least one yeast cell or spore to treatment with radiation, such as UV irradiation, X-ray irradiation, gamma-ray irradiation, or a mutagenic agent, preferably a chemical agent such as NTG (N-methyl-N'-nitro-N-nitrosoguanidine) or EMS (ethylmethanesulfonate).

Adsorption of AcHFA, or a AcHFA Precursor

In a further preferred embodiment, the fermented beer is contacted with an adsorbent capable of adsorbing AcHFA. In addition, it is possible to remove the AcHFA precursor from the wort prior to fermentation by contacting the wort with an adsorbent capable of adsorbing the AcHFA precursor.

It has been found that for removal of the AcHFA precursor from wort, and for removal of AcHFA from the beer during or after fermenting, the same adsorbents can be used. That is, the AcHFA precursor and AcHFA itself adsorb to substantially the same adsorbents. Suitable adsorbents include activated carbon, a hydrophobic adsorbent, a hydrophilic adsorbent, and a zeolite. Preferably, these adsorbents are applied during or after fermentation (preferably after fermentation), to adsorb AcHFA from the beer.

For improving the foam stability of unhopped beer, the beer may be contacted with any adsorbent which is suitable to adsorb AcHFA (or a precursor therefore). In preferred embodiments therefore, the beer is unhopped. Optionally, beer may be hopped later, to achieve a further foam stability enhancement, and further (flavor) advantages. Hopped beer comprises iso-alpha acids, which have a further stabilizing effect on beer foam.

For improving the foam stability of hopped beer, the beer is preferably contacted with an adsorbent which does not substantially adsorb iso-alpha-acids. Iso-alpha-acids derive from hop through wort boil, and are known to have a foam-stabilizing effect. The skilled person appreciates that it is possible to use any adsorbent also for hopped beer, as long as the adsorbent has a net improving effect on foam stability. This may depend on the quantity of hop used, and/or the quantity of AcHFA formed during fermentation. In preferred embodiments, a hopped beer may be further hopped after the AcHFA removal step has been completed.

Activated carbon is well known on the art, and can be used as an adsorbent to remove AcHFA and obtain an AcHFA-reduced beer according to the invention. However, a drawback of activated carbon is that it is not very efficient in AcHFA removal). In addition, activated carbon sigificantly adsorbs iso-alpha acids, which is a drawback in the treatment of hopped beer. A further drawback is that active carbon decolours the beer, leading to an overpale drink which is not attractive to consumers.

Hydrophobic adsorbents include hydrophobic polymeric adsorbents, preferably polymeric adsorbents comprising aromatic and/or acyl groups. The skilled person cam readily determine, based on common general knowledge and the methods described herein, which adsorbents are suitable to reduce AcHFA (or its precursor) from beer (or wort). It is an advantage of hydrophobic polymeric adsorbents that they are very efficient in removing AcHFA (or an AcHFA precursor). In addition, the colour of the beer is retained, and these adsorbents adsorb relatively little, or even no, iso-alpha acids. Consequently, hydrophobic polymeric adsorbents are preferred, such as in particular polystyrene/divinyl benzene (PS/DVB), for example PLRP-S marketed by Agilent).

Hydrophilic adsorbents are preferably hydrophilic polymeric adsorbents. A much preferred hydrophilic adsorbent is a mixed cellulose ester adsorbent, for example MCE (MF-Millipore™ membrane filters, Merck). This is the most efficient adsorbent among the adsorbents tested, which leaves intact the colour of the beer and does not adsorb iso-alpha acids. In addition, it can be regenerated, which in particular for industrial beer production leads to decreased production cost and less waste material.

Further preferred adsorbents are for example Supelclean-Ti adsorbents, such as preferably Supelclean LC C18, Supelclean LC C8, Supelclean LC Ph, Supelclean LC CN, or Supelclean LC SCX, more preferably Supelclean LC C18, Supelclean LC C8, or Supelclean LC Ph, most preferably Supelclean LC C18, Supelclean LC C8. These adsorbents are preferred for the same reasons as described above for MCE and PLRP-S.

A zeolite, in the present context, is preferably a hydrophobic zeolite. This is a silicate-based molecular sieve containing $SiO_2$ and $Al_2O_3$ in a molar ratio ($SiO_2:Al_2O_3$) of at least 15. The term "molecular sieve" as used herein refers to a microporous material having pores with a diameter of not more than 2 nm. The term "silicate based" means that the material contains at least 67 wt. % silicate. A "zeolite" thus is a microporous aluminosilicate. Zeolite adsorbents in the present context can be naturally occurring zeolites or synthetic zeolites.

It should be understood that hydrophobic silicate-based molecular sieves that contain $SiO_2$ and no $Al_2O_3$ meet the condition that the molecular sieve contains $SiO_2$ and $Al_2O_3$ the molar ratio of at least 15 (in which case the zeolite is a microporous silicate, rather than a microporous aluminosilicate).

According to a preferred embodiment, the adsorbent is a hydrophobic zeolite. The hydrophobic zeolite that is employed in the present process preferably has a molar $SiO_2/Al_2O_3$ ratio of at least 40, more preferably of at least 100, even more preferably of at least 200, most preferably of at least 250.

The average pore size diameter of the hydrophobic zeolite preferably is in the range of 0.2-1.2 nanometer, more preferably 0.3-1.0 nanometer, even more preferably of 0.4-0.8 nanometer and most preferably of 0.45-0.70 nanometer. The pore size diameter of the hydrophobic zeolite can be determined by analysing the nitrogen adsorption isotherms at 77 K with the t-plot—De Boer method.

The surface area of the hydrophobic zeolite preferably is at least 100 $m^2/g$, more preferably 150 to 2000 $m^2/g$ and most preferably 200 to 1000 $m^2/g$. The surface area of the hydrophobic molecular sieve can be determined by the BET method.

The hydrophobic zeolite preferably has a mass weighted average particle size in the range of 1 to 2000 micrometer, more preferably in the range of 10 to 800 micrometer and most preferably of 100 to 300 micrometer. The particle size distribution of the particulate hydrophobic molecular sieve can be determined using a set of sieves of different mesh sizes.

The hydrophobic zeolite is preferably selected from ZSM-5 zeolite, zeolite type Y, zeolite-beta, silicalite, all-silica ferrierite, mordenite and combinations thereof. More preferably, the hydrophic zeolite is selected from ZSM-5 zeolite, zeolite type Y, zeolite-beta and combinations thereof. Most preferably, the hydrophobic zeolite is ZSM-5 zeolite.

Adsorbents for use as disclosed herein may be applied as is known in the art.

For removal of AcHFA during fermentation, the fermenting mixture can be contacted with the adsorbent, for example by passing the mixture over a column packed with the adsorbent, or by adding the adsorbent as a particulate material to the fermenting mixture and subsequently removal of the adsorbent by filtration, cycloning or another suitable technique.

For removal of AcHFA after fermentation, the beer obtained from the fermentation may be contacted with the adsorbent, for example by passing the beer over a column packed with the adsorbent, or by adding the adsorbent as a particulate material to the beer and subsequently removal of the adsorbent by filtration, cycloning or another suitable technique. In preferred embodiments, the beer obtained from fermentation is introduced in a hold-up tank, where it is contacted with the adsorbent for a period of for example 20 minutes −24 hours, preferably 0.5-5 hours, in order to adsorb AcHFA. The AcHFA can subsequently be removed by filtration. Alternatively, the beer may be filtered continuously over a filter loaded with the adsorbent.

For removal of an AcHFA precursor, the wort may be contacted with the adsorbent prior to fermentation, for example by passing the wort over a column packed with the adsorbent, or by adding the adsorbent as a particulate material to the wort and subsequent removal of the adsorbent by filtration, cycloning or another suitable technique. Preferably, wort is contacted as sweet wort, prior to pitching.

The skilled person knows countless techniques to adsorb an unwanted component from a liquid mixture by adsorption, and any technique may be applied in order to obtain beer with a reduced quantity of AcHFA as defined herein. Suitable techniques are for example described in C. Judson King, Separation Processes (2nd edition) McGraw-Hill, Inc. 1980.

The wort, fermenting mixture or beer is contacted with the adsorbent for a time which is sufficient to adsorb AcHFA, or its precursor. This can readily be determined by those skilled in the art, based on common general knowledge and the methods disclosed herein. Preferably, the contacting time is 5 minutes-48 hrs, more preferably 0.5-24 hrs, more preferably 1-20 hrs.

The quantity of adsorbent to be used can also readily be determined by those skilled in the art, based on common general knowledge and the methods disclosed herein. Preferably, the adsorbent is used at a dose of 0.001-10 g/l, more preferably 0.01-5 g/l, more preferably at a dose of 0.05-2.5 g/l.

Depending on the type and nature of the beer, the type and quantity of adsorbent, and the contacting time, the quantity of AcHFA can be reduced substantially, as can be readily ascertained by the skilled person. The quantity of AcHFA can be reduced by at least 50%, preferably at least 75%, more preferably at least 80%. In some embodiments, the quantity of AcHFA can be reduced up to 90% or even up to 95%, or higher. In preferred embodiments wherein AcHFA is removed from beer by adsorption, the quantity of AcHFA is reduced to less than 60% of the initial quantity, more preferably to less than 20% of the initial quantity, most preferably to less than 5% of the initial quantity.

The effect of AcHFA reduction is that foam stability is increased, by at least 10 seconds, preferably at least 15 second, more preferably at least 20 seconds. Foam stability may be increased by up to 40 seconds, or even up to 50 seconds or higher.

In much preferred embodiments, the invention pertains to a method for increasing the foam stability of beer, comprising contacting a beer obtained by fermentation with an adsorbent capable of adsorbing AcHFA. The adsorbent and the way of contacting the beer with the adsorbent are as defined above. This results in a beer with increased foam stability, as described above.

For the purpose of clarity and a concise description features are described herein as part of the same or separate embodiments, however, it will be appreciated that the scope of the invention may include embodiments having combinations of all or some of the features described.

The invention will now be further illustrated by the following, non-limiting examples.

Methods

AcHFA Analysis

The AcHFA contents in beer can be analyzed by LC-MS. The LC-MS system consisted of a Waters TQ-S mass spectrometer and a Waters Acquity UPLC system. The mobile phase consisted of:

A: Milli-Q water+0.1% (v/v) formic acid
B: Acetonitrile+0.1% (v/v) formic acid

The analytical column was a 15 cm*2.1 mm ID UPLC BEH C18 (1.7 um) column.

AcHFA was separated from the other matrix constituents with the following gradient:

T 0 min: 95% A, 5% B
T 13 min: 70% A, 30% B
T 17 min: 5% A, 95% B
T 25 min: 95% A, 5% B Flow rate was set at 0.25 ml/min and the column was thermostated at 50° C. The UPLC system was connected to the MS via an electrospray interface (ESI) that was operated in the negative ion mode. MRM data were recorded for the following transition: m/z 355>295. Cone voltage was set at 40 Volts. Collision Energy was set at 15 eV. AcHFA was detected as the compound represented by structure 3 AcHFA quantity was expressed in arbitrary units (a.u), which are derived from the peak surface of the chromatogram to provide quantitative results.

Determination of Sugar Content in Beer

The sugar content was measured with Ultra Performance Liquid Chromatography (UPLC). UPLC can be suitably conducted at a temperature of 65° C. A suitable choice for the eluent is a mixture of acetonitrile/water, for example in a 75/25 volume ratio. The detector used is typically a Refractive Index (RI) detector. The sugar content of a sample was determined by comparing the UPLC curve of the sample with calibration curves of standard samples with known sugar concentrations.

The samples for UPLC were prepared as follows. A sample of beer or wort was diluted by a factor 5 by addition of acetonitrile/water mixture (50/50-equal volume parts). If present, $CO_2$ was removed prior to dilution (e.g. by shaking or stirring the sample). After dilution, the sample was filtrated to obtain a clear solution. The filtered sample was injected into the UPLC at 65° C. using the above-mentioned eluent.

Determination of Free Amino Nitrogen (FAN)

The amount of free amino nitrogen (such as amino acids, small peptides and ammonia) was measured according to the Nitrogen by O-Phthaldialdehyde Assay (NOPA) method. The NOPA method was conducted using a photometric analyzer (e.g. Gallery™ Plus Photometric Analyzer).

According to the NOPA method, a test sample is subjected to a treatment with ortho-phtaldialdehyde (OPA) and N-acetylcystein (NAC). This treatment will results in the derivatization of primary amino groups present in the test sample under the formation of isoindoles. The content of the isoindoles is subsequently determined using the photometric analyzer at a wavelength of 340 nm. The free amino nitrogen (expressed in mg FAN/l) can then be calculated based on the measured content of the isoindoles. If necessary, the beer or wort sample is first subjected to centrifugation to clarify the sample and/or to a C02 removal step (e.g. by stirring or shaking the sample) before analysis.

Determintation of Ethanol in Beer

The ethanol content was measured using a photometric analyzer (e.g. Gallery™ Plus Photometric Analyzer). The test sample is subjected to an enzymatic method wherein the ethanol present in the sample is converted to acetaldehyde with alcohol dehydrogenase (ADH). The acetaldehyde content is subsequently determined using the photometric analyzer at a wavelength of 340 nm. The ethanol content can be calculated based on the acetaldehyde content. If necessary, the beer or wort sample is first subjected to centrifugation to clarify the sample and/or to a C02 removal step (e.g. by stirring or shaking) before analysis.

Determination of Iso-Alpha-Acids in Beer

Iso-alpha acids were quantitatively determined using EBC 9.47 2010: Iso-α-acids and reduced iso-α-acids (Rho, Tetra, Hexa) in beer by HPLC.

Determination of Foam Stability

Foam stability is determined according to the standards set by NIBEM Institute, EBC 9.42.1.

Degassing and Recarbonation

All experiments with AcHFA adsorption from beer were performed on regular beer, which had been degassed. Prior to measuring foam stability, beer was recarbonated.

Degassed beer was obtained as follows:

About 200 ml of bottled beer (4° C.) was carefully transferred (prevent foaming) into clean 500 ml laboratory bottles. The bottles containing the samples were put into a 20° C. water bath, and shaken gently (40 rpm) for 40 minutes.

Next, the intensity of shaking was increased to 120 rpm, and shaking was continued for 30 minutes, to obtain the degassed beer. During the whole degassing treatment, the head space of the bottles was continuously flushed with nitrogen gas to prevent oxidation of the beer.

Recarbonation was achieved at lab scale as follows. Stainless steel Millipore vessels (model Millipore catalog no xx6700p05) were prepared to allow them to be used as regular beer kegs. Kegs were cleaned and flushed with C02 to remove air prior to addition of the beer. Beer samples of about 1-2 litres were transferred into the kegs, and the samples were put under 2.5 bar of $CO_2$ pressure while shaking for 100 rpm for 30 minutes. The whole procedure was done at 20 C.

$CO_2$ pressure was used to dispense beer using a spear placed about 0.7 cm from the bottom of the vessel. Hence, foam was prepared by connecting the Nibem foam dispenser instrument to the ($CO_2$ pressurized) keg, similar as done when using bottled beer. Foam stability was determined according to the described Nibem method.

Example 1

Removal of AcHFA from Beer Results in Foam Stabilization

Degassed beer was incubated with 0.1 g/l commercial methyl cellulose ester adsorbent (MCE, MF-Millipore™ membrane filters, Merck) for 16 hours at room temperature. Subsequently, the beer was filtered over a 0.2 μm filter and recarbonated.

The results show that adsorption of AcHFA to MCE and subsequent removal of AcHFA from the beer results in beer with enhanced foam stability. The blanc beer was subjected to the same procedure except for the adsorption step. After treatment, AcHFA in the treated beer was reduced to 6.3% of the quantity in the regular beer. The blank beer had a (NIBEM) foam stability of 253 seconds, whereas the MCE-treated beer had a foam stability of 296 seconds. Thus, removal of more than 90% of AcHFA resulted in an increase in foam stability of 17%.

It has been shown that the AcHFA removal process results in efficient removal of AcHFA both in hopped beer, and in non-hopped beer (data not shown). In addition, it has been found that MCE does not significantly adsorb iso-alpha acids, and that beer color is not decreased. This is beneficial, as iso-alpha acid presence has a further stabilizing effect on beer foam. Therefore, MCE is a much preferred adsorbent.

Example 2

AcHFA is a Foam-Negative Factor

Degassed regular beer was obtained as described in Example 1. The beer in this case was a hop-free, full malt beer. The degassed beer was incubated for 16 hours at room temperature with 0.2 g/l PLRP-S (Agilent) to effect full removal of AcHFA and obtain an AcHFA-free non-hopped beer.

The adsorbent was filtered and isolated, and washed with acetonitrile to obtain crude AcHFA. The crude AcHFA was fractionated in a reverse-phase HPLC column (C18) using a water to acetonitrile gradient. The obtained fractions were tested for their effect on foam stability by addition to beer, and the foam negative fractions were collected and analyzed by LC-MS and characterized by NMR as AcHFA according to the definition in the description. Thus, pure AcHFA was isolated and characterized.

To degassed hopped and degassed non-hopped beer with regular quantities of AcHFA as obtained by conventional fermentation, there was added an additional quantity of pure AcHFA. After gentle homogenization and recarbonation as described in Example 1, foam stability was determined as described. The quantity of added AcHFA is shown in Table 1, and represented in FIGS. 2a and 2b.

TABLE 1

Figure 1:
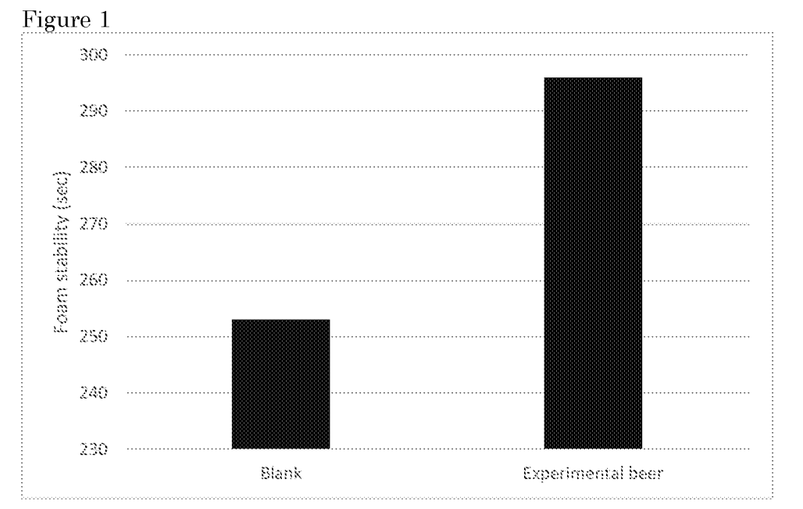
FIG. 1: Comparison in foam stability before and after an adsorption process with methyl cellulose ester adsorbent.
Figure 2A:
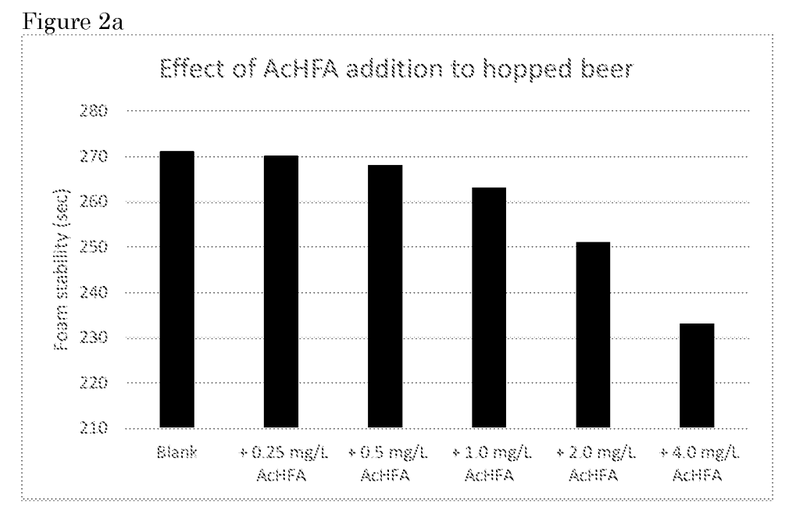
Figure 2B:
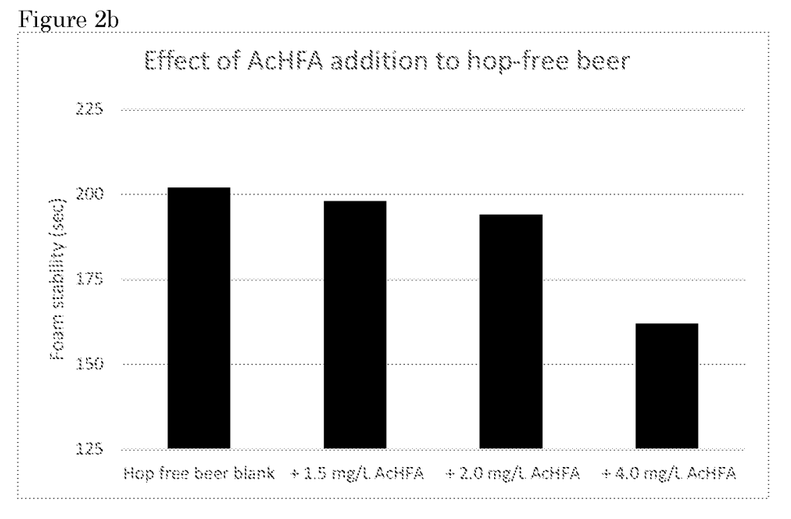

| beer | foam stability [sec] | beer | foam stability [sec] |
|---|---|---|---|
| hopped beer | 271 | hop free beer | 202 |
| +0.25 mg/L AcHFA | 270 | +1.5 mg/L AcHFA | 198 |
| +0.5 mg/L AcHFA | 268 | +2.0 mg/L AcHFA | 194 |
| +1.0 mg/L AcHFA | 263 | +4.0 mg/L AcHFA | 162 |
| +2.0 mg/L AcHFA | 251 | | |
| +4.0 mg/L AcHFA | 233 | | |

The results show that by increasing the quantity of AcHFA in regular beer, the foam stability of beer decreases rapidly. Thus, it has been concluded that AcHFA is a foam negative factor, and that beer with lower quantities of AcHFA has increased foam stability.

Example 3

Beer with a Reduced Quantity of AcHFA has Higher Foam Stability

In a further experiment, AcHFA-free hopped beer and AcHFA-free hop-free beer was obtained by incubation for 16 hours at room temperature with 0.2 g/l PLRP-S (Agilent) to effect full removal of AcHFA. Prior to AcHFA addition to the hopped beer, loss of iso-alpha acids during the adsorption step was compensated for by addition of 20 mg/l iso-alpha acids ("IAA", B-hop, Hopsteiner). Both AcHFA beers were subsequently degassed.

To the AcHFA-free beers, AcHFA was added in various quantities. After gentle homogenization and recarbonation as described above, foam stability was determined. The results are shown in table 2, and in FIGS. 3a and 3b.

TABLE 2

Figure 3A:
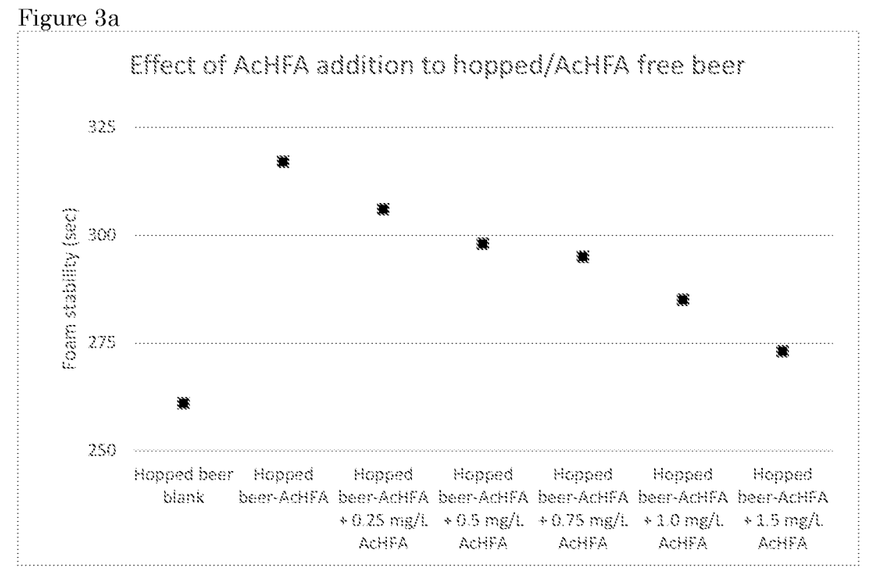
Figure 3B:
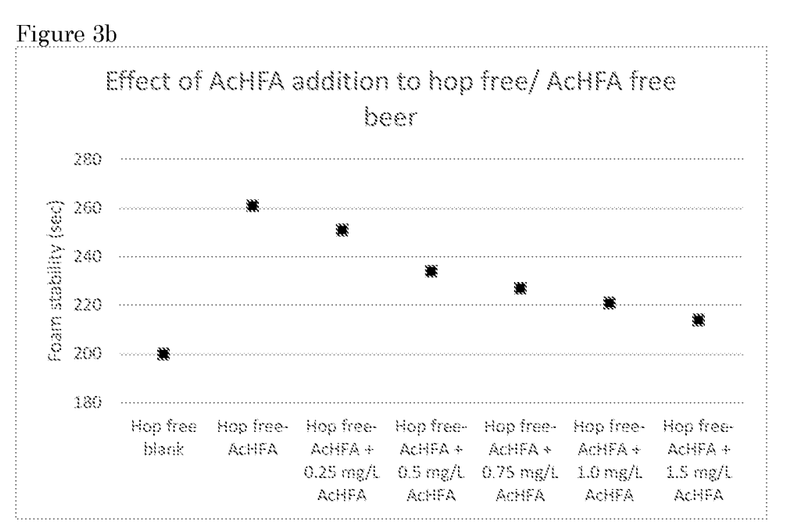

| beer | foam stability | beer | foam stability |
|---|---|---|---|
| Hopped beer (AcHFA-free) | 261 | Hop free ((regular AcHFA) | 200 |
| Hopped beer (+IAA), AcHFA-free | 317 | Hop free (AcHFA-free) | 261 |
| Hopped beer (+IAA) + 0.25 mg/L AcHFA | 306 | Hop free + 0.25 mg/L AcHFA | 251 |
| Hopped beer (+IAA) + 0.5 mg/L AcHFA | 298 | Hop free + 0.5 mg/L AcHFA | 234 |
| Hopped beer (+IAA) + 0.75 mg/L AcHFA | 295 | Hop free + 0.75 mg/L AcHFA | 227 |
| Hopped beer (+IAA) + 1.0 mg/L AcHFA | 285 | Hop free + 1.0 mg/L AcHFA | 221 |
| Hopped beer (+IAA) + 1.5 mg/L AcHFA | 273 | Hop free + 1.5 mg/L AcHFA | 214 |

The results show that decreasing the quantity of AcHFA in beer to below the levels in regular beer, results in an increase in foam stability in a AcHFA-concentration dependent manner. Beer without AcHFA has the highest foam stability.

Example 4

Reducing AcHFA in Beer

A regular (hop-free) beer with a conventional quantity of AcHFA was obtained. This beer was degassed as described and contacted in 30 ml portions (10 column volumes) with the same quantity of various Supelclean™ adsorbents (Sigma Aldrich) in a 3 ml SPE column, and subsequently recarbonated. The results are displayed in Table 3, and in FIG. 4.

TABLE 3

Figure 4:
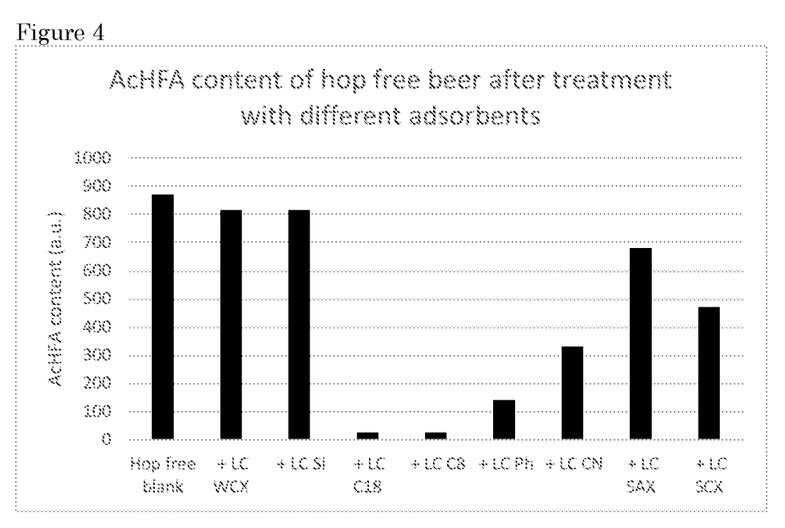
FIG. 4: AcHFA removal from beer by a variety of adsorbents.

| sample | AcHFA (a.u.) | % of initial |
|---|---|---|
| Hop free blank | 870 | 100% |
| +LC WCX | 815 | 94% |
| +LC Si | 815 | 94% |
| +LC C18 | 25 | 3% |
| +LC C8 | 25 | 3% |
| +LC Ph | 140 | 16% |
| +LC CN | 330 | 38% |
| +LC SAX | 680 | 78% |
| +LC SCX | 470 | 54% |

The results show that a variety of hydrophobic and hydrophilic adsorbents is capable of reducing the quantity of AcHFA in beer. Preferred adsorbents are LC C18, LC C8 and LcPh. In preferred embodiments, AcHFA is reduced to less than 60% of the initial quantity, more preferably to less than 20% of the initial quantity, even more preferably to less than 5% of the initial quantity.

Example 5

Reducing AcHFA in Beer Using PLRP-S and Activated Carbon

Figure 5:
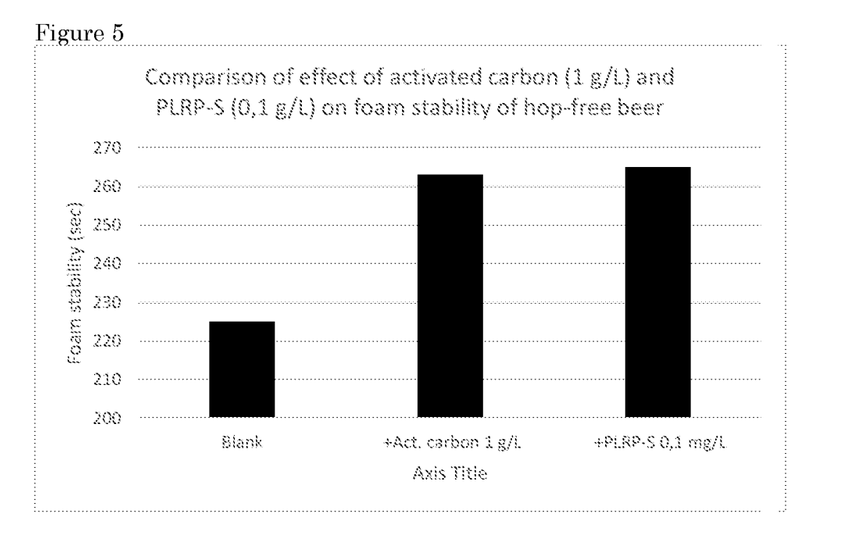
FIG. 5: The activity of two adsorbents in removing AcHFA from beer.

Hop-free, degassed beer was contacted with PLRP-S (0.1 mg/l) and with 1.0 mg/l activated carbon (Aktivkohle, art. 2186 Merck), and subsequently recarbonated. The results are shown in FIG. 5.

The results show that PLRP-S is more efficient at removing AcHFA from beer. In addition, it was observed that active carbon removes color from the beer, which is considered a drawback. PLRP-S leaves the beer color intact. In addition, PLRP-S does not significantly adsorb iso-alpha acids. Therefore, PLRP-S (and MCE, see Example 1) are preferred adsorbents over active carbon.

Example 6

Figure 6:
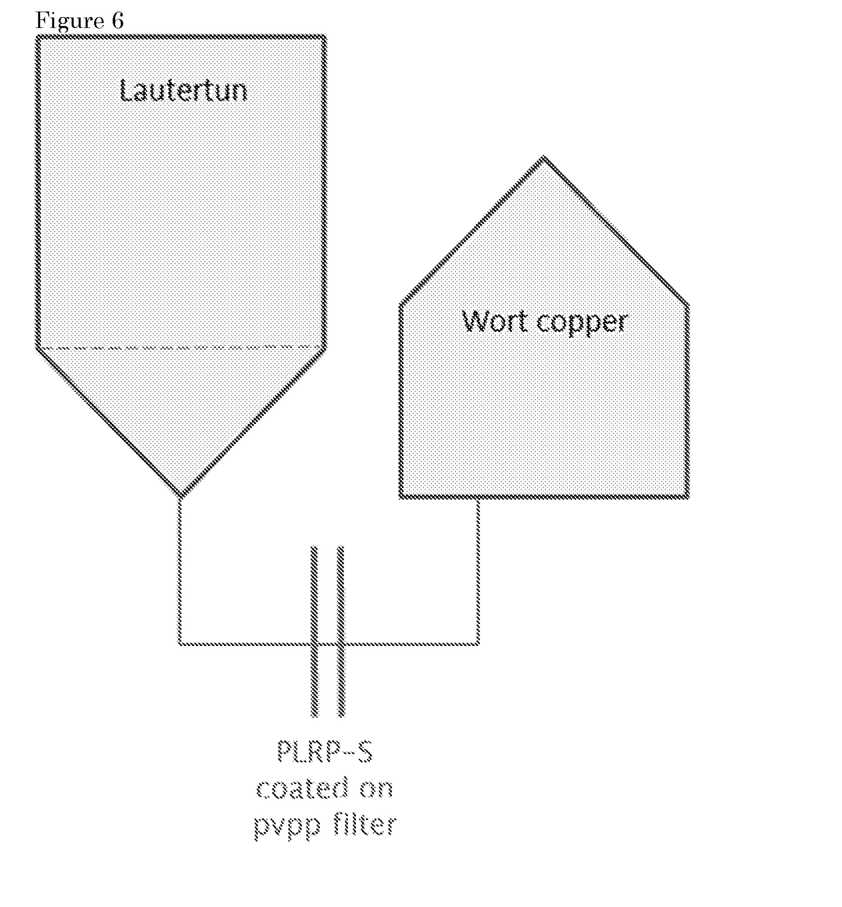
FIG. 6: Installation of an adsorbent filter in an industrial scale beer brewing process.

Removal of AcHFA Precursor from Sweet Wort, in Order to Obtain. Beer with a Decreased Quantity of AcHFA Relative to Conventional Beer In a conventional pilot plant beer brewing process, sweet wort was treated with PLRP-S by coating 750 g PLRP-S on a PVPP filter installed between the lautertun and the wort copper, and treating 15 hl of sweet wort with the said filter prior to entry in the wort copper (FIG. 6). Subsequently, beer was brewed in a conventional manner (hop addition, boiling, whirlpool, fermentation, and post-treatment and bottling).

From the same wort, a comparative beer was brewed using the same process conditions, but without filtering the sweet wort over the PLRP-S loaded filter.

Analysis of the quantity of the AcHFA precursor (a dihydroxy fatty acid) was done on a sample of the hopped wort (pitching wort), using HPLC conditions as described for AcHFA. The quantity of AcHFA was determined on the final beer. The results are shown in table 4.

|  | Blank | Experimental |
|---|---|---|
| foam stability (sec) | 270 | 288 |
| total iso-α-acids (mg/L) | 18.4 | 18 |
| AcHFA precursor in wort (a.u.) | 22900 | 6530 |
| AcHFA in beer (a.u.) | 25900 | 5790 |

The results show that by removal of the AcHFA precursor by adsorption, formation of AcHFA in the final beer can be prevented. This has the result that the foam stability of the obtained beer increases.

The results furthermore show that the adsorption process can be applied on an industrially relevant scale.

Example 7

Obtaining Beer with a Reduced Quantity of AcHFA by Modification of Yeast

In this example a deletion library of *S. pastorianus* wild type (WT) yeast with different combinations of deleted alleles of ATF1 and ATF2 was constructed using CRISPR-Cas9 technology. *S. pastorianus* WT contains five copies of ATF1 and four copies of ATF2 from both *S. cerevisiae* and *S. eubayanus* genomes. With the CRISPR-Cas9 system functional in *S. pastorianus*, all copies of one gene are targeted in a single transformation. Ultimately, nine ATF1/2 genes were deleted from four different chromosomes in only two transformations. The ATF-1 deficient yeast is called "strain a". The ATF-2 deficient yeast is called "strain b". The yeast deficient in both ATF-1 and ATF-2 is called "strain c". The impact of various knockouts in the was studied by growing the strains under brewing relevant conditions. The strains showed similar growth rates, sugar consumption profiles, and ethanol production during a standard brewing fermentation in 15° Plato wort.

Obtaining Mutants from Wild-Type Yeast

Figure 7A:
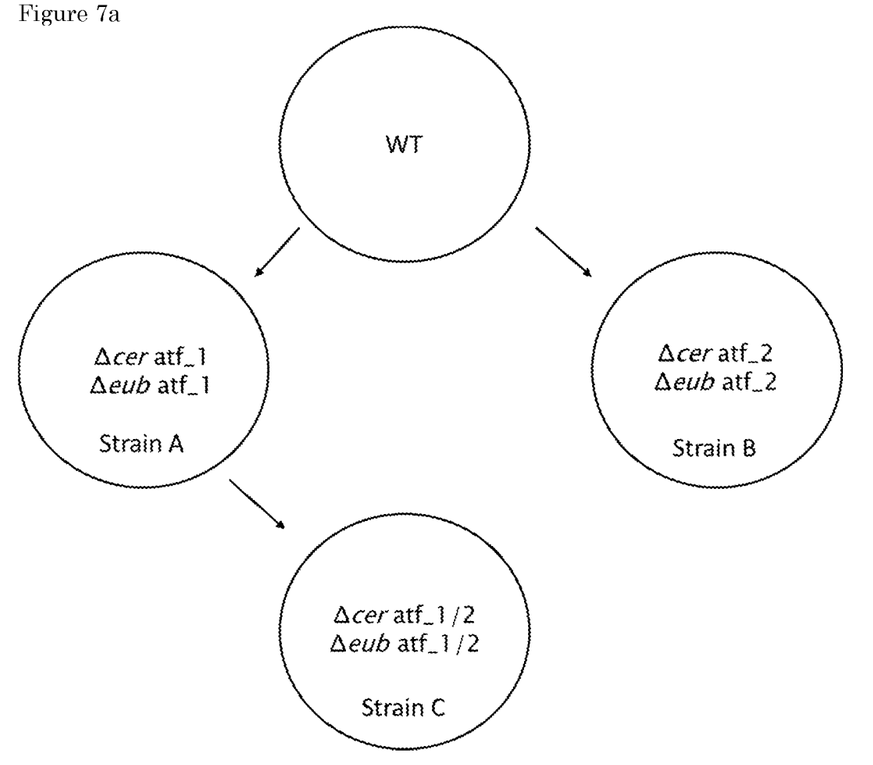
FIG. 7*a*: ATF-1 mutations in yeast.

Mutant strains were obtained following the methodology as described in "CRISPR-Cas9 mediated gene deletions in lager yeast *Saccharomyces pastorianus*", Arthur R. Gorter de Vries et al., Microb Cell Fact (2017) 16:222. A display of the mutations is shown in FIG. 7a.

Characterisation of WT with ATF Deletions Under Brewing Conditions

Figure 7B:
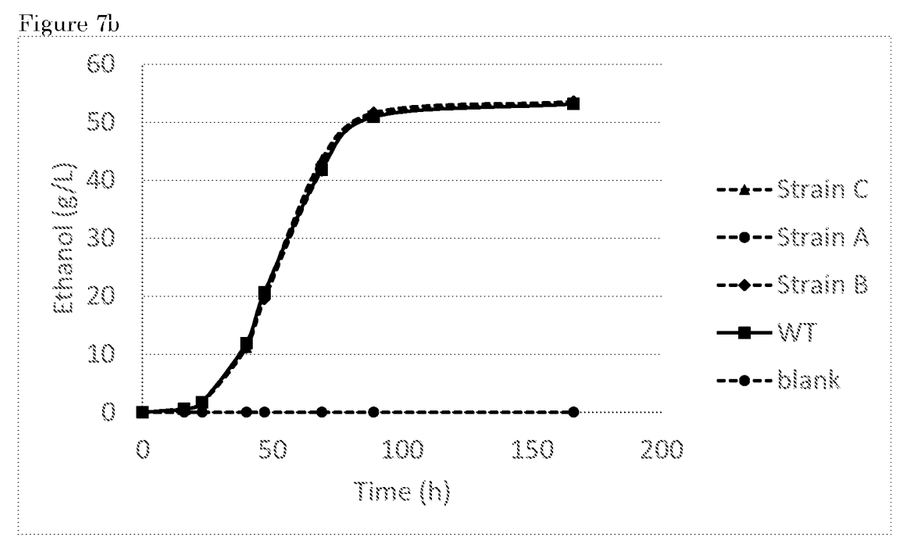
FIG. 7*b*: Ethanol production of ATF-1 deficient yeast (strain a), ATF-2 deficient yeast (strain b), and yeast deficient in both ATF-1 and ATF-2 (strain c), as compared to the non-modified yeast (WT).

To check for fermentation performance, the strains were inoculated in autoclaved and filter sterilised wort of 15° Plato with additional zinc to meet growth requirements of the yeast. Three bottles per strain were inoculated with the same cell concentration of approximately 5 million cells. All bottles were sampled at the start of the experiment and after seven days of fermentation for analysis on the HPLC. However, one bottle of each triplicate was also sampled during the fermentation to monitor the sugar consumption and the production of glycerol, ethanol, and biomass, to compare to fermentation with WT. After fermentation, the supernatant from each bottle was analysed for sugar, glycerol, and ethanol by HPLC. It was observed that the mutant strains display substantially identical behavior when applied in a fermentation, to the wild-type yeast. The sugar consumption profile in time for glucose, maltose, maltotriose, and fructose indicate that a substantially identical consumption profile is used. Also glycerol and ethanol production as monitored during the fermentation was substantially identical. Also, the cell growth rate (as measured by optical density) was substantially identical. A exemplary figure showing the ethanol production of strains a, b and c is incorporated as FIG. 7b. On all tested parameters, the mutant strains displayed substantially identical characteristics, and a substantially identical time course. The mutant strains could therefore be applied in existing production processes, in order to decrease the quantity of AcHFA in the final beer.

Thus, ATF-deficient yeast types were obtained which could be applied under the same conditions as the WT yeast. The ATF-1 deficient yeast (strain a), the ATF-2 deficient yeast (strain b), and the yeast deficient in both ATF-1 and ATF-2 (strain c) were used in a standard fermentation of wort, to evaluate their activity in a standard beer brewing process. The different yeasts—5 mio cells/ml inoculated—were fermented in 150 ml full-malt hopped 15-16P wort in 250 ml infusion flasks, shaken at 200 rpm, at 13 C for 7 days under micro-aerobic conditions. The obtained beer was compared to beer obtained with the non-modified WT yeast. The results are shown in Table 5:

TABLE 5

| yeast | type | AcHFA (a.u.) | % relative to WT |
|---|---|---|---|
| WT | wild type (WT) | 28200 | 100 |
| strain a | deletion ATF1 | 4155 | 15 |
| strain b | deletion ATF2 | 21800 | 77 |
| strain c | deletion ATF1 + ATF2 | nd | 0 |

The results show that using an ATF-1 deficient yeast, AcHFA is reduced to 15% of the quantity of AcHFA observed using a wild type yeast. With an ATF-2 deficient yeast, AcHFA is reduced to 77% of the quantity of AcHFA observed using a wild type yeast. By using a yeast which is deficient in both ATF-1 and ATF-2 (preferably all copies), AcHFA formation can be completely suppressed.

Example 8

Removal of AcHFA from Regular Beer on an Industrially Relevant Scale, in Order to Obtain Beer with a Decreased Quantity of AcHFA Beer was brewed in a pilot plant using a conventional process and a conventional yeast. The brewing process resulted in lager beer. Lager beer with added iso-alpha acids ("IAA") was obtained (20 mg/l B-hop, Hopsteiner), as well as beer without added iso-alpha acids.

Figure 8A:
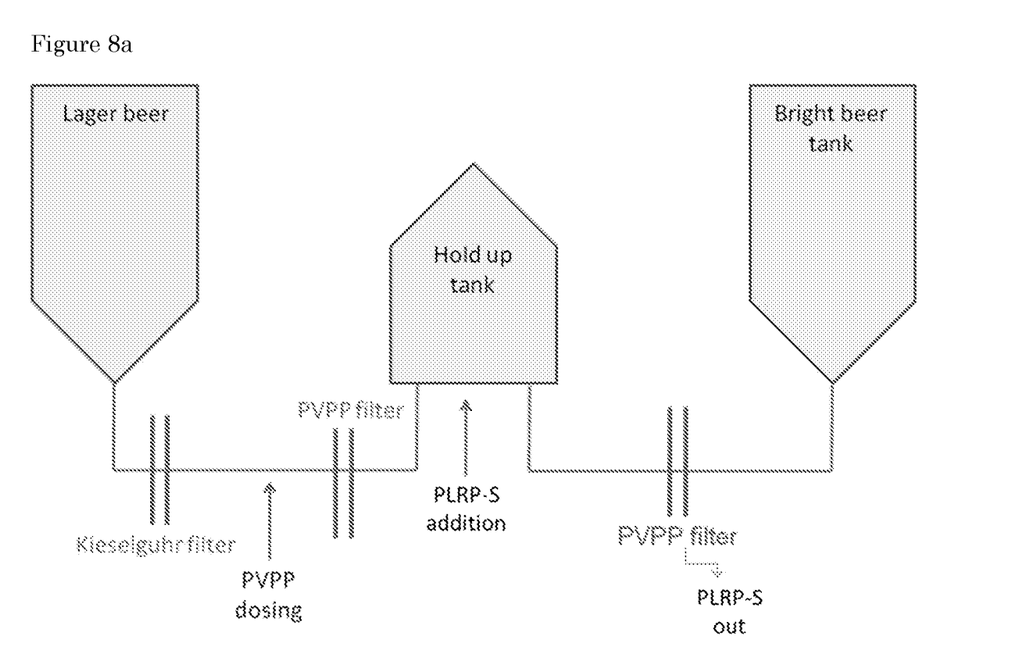
FIGS. 8*a* and *b*: Exemplary setups to remove AcHFA from beer on a factory-relevant scale.
Figure 8B:
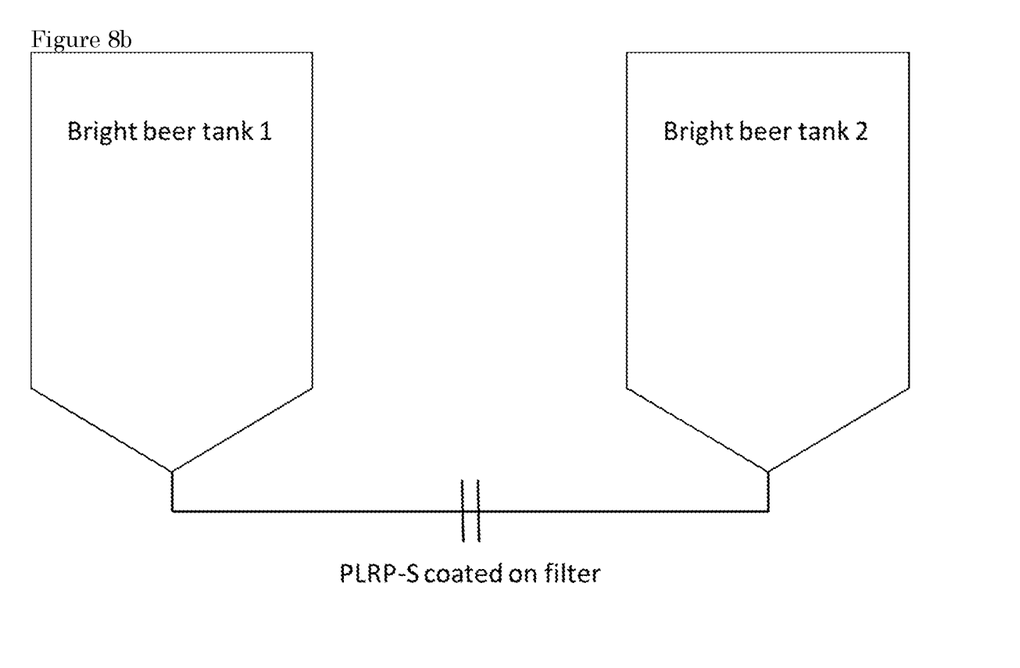
Figure 9:
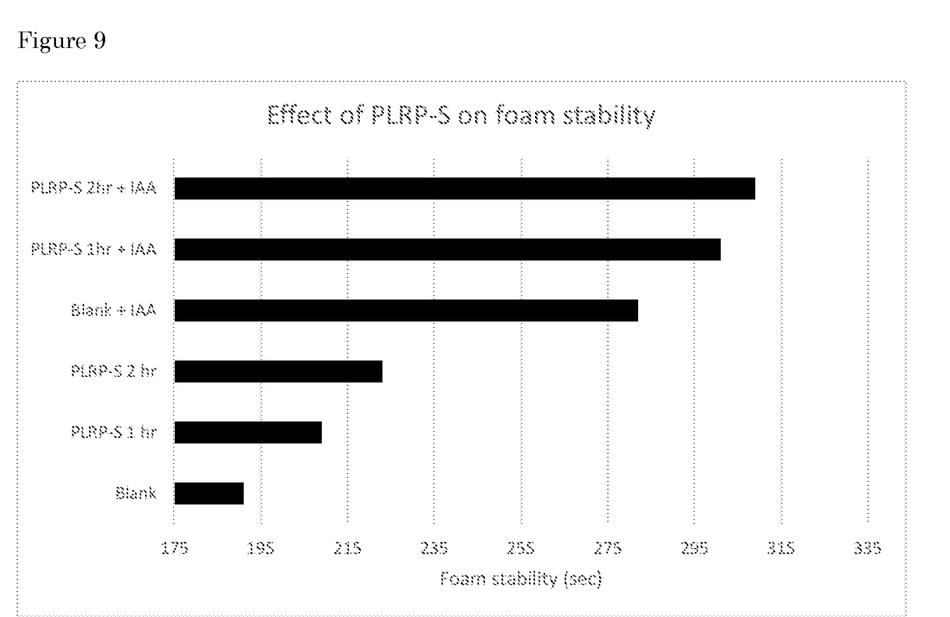
FIG. 9: Increased foam stability in beer produced using a factory-relevant scale.

The lager beer was filtered and stabilized with PVPP, and stored in a hold-up tank, where it was contacted with 0.1 g/l PLRP-S (Agilent) for one or two hours. Subsequently, the beer was filtered to remove the PLRP-S and the adsorbed AcHFA (FIG. 8a). Alternatively, the beer obtained from fermentation could be filtered over a PLRP-S-coated filter to remove AcHFA (FIG. 8b; data for the obtained beer not shown, but comparable to those for beer obtained by the process displayed in FIG. 8a).

AcHFA quantities were analyzed and compared to the quantity in beer without the said filtrations step. In addition, foam stability of the obtained beer was compared.

The results show that by treatment of beer as obtained from fermentation with PLRP-S for one or two hours, the AcHFA quantity could be significantly reduced. This had a significant and positive effect on the foam stability, both in beer with and in beer without added iso-alpha acids. Therefore, adsorbents such as PLRP-S can be used to remove AcHFA and increase foam stability of beer.

The invention claimed is:

1. A beer, comprising less than 2 mg/l of acetylated hydroxy fatty acid, wherein said acetylated hydroxy fatty acid is defined by structure 2:

wherein n=1, 2, or 3;
m=1 or 2;
one of A and B is OH, and the other of A and B is OAc.

2. The beer according to claim 1, comprising 0-15 vol. % ethanol.

3. The beer according to claim 1, comprising less than 1.5 mg/l acetylated hydroxy fatty acid.

4. The beer according to claim 1, comprising a total of iso-alpha-acids of 5-55 mg/l.

5. The beer according to claim 1, comprising a total sugar content, defined as the total of glucose, fructose, sucrose, maltose, and maltotriose, of 0.05-5 g/100 ml.

6. A method for increasing the foam stability of beer, comprising a step (1) of fermenting wort to obtain beer, wherein
   a) the fermentation of step (1) is achieved using an acetyl transferase (ATF) deficient yeast; and/or
   b) the beer of step (1) is contacted with an adsorbent capable of adsorbing acetylated hydroxy fatty acid during or after fermentation; and/or
   c) the wort of step (1) has been subjected to a step of removal of an acetylated hydroxy fatty acid precursor by an adsorbent capable of adsorbing the acetylated hydroxy fatty acid precursor,
wherein the acetylated hydroxy fatty acid is defined by structure 2:

2 wherein n=1, 2, or 3;
m=1 or 2;
one of A and B is OH, and the other of A and B is OAc, and
wherein the beer with increased foam stability comprises less than 2 mg/ml of the acetylated hydroxy fatty acid defined by structure 2.

7. The method according to claim 6, wherein the adsorbent is an activated carbon, a hydrophobic adsorbent, a hydrophilic adsorbent, or a zeolite.

8. The method according to claim 6, wherein the adsorbent is activated carbon, a polystyrene/divinylbenzene adsorbent, a mixed cellulose ester adsorbent, or a hydrophobic zeolite, preferably a polystyrene/divinylbenzene adsorbent, a mixed cellulose ester adsorbent, or a hydrophobic zeolite.

9. The method according to claim 6, comprising contacting the beer of step (1) with the adsorbent.

10. The beer according to claim 3, comprising less than 1.0 mg/l acetylated hydroxy fatty acid.

11. The beer according to claim 3, comprising less than 0.5 mg/l acetylated hydroxy fatty acid.

12. The beer according to claim 3, comprising less than 0.25 mg/l acetylated hydroxy fatty acid.

13. The method of claim 9 wherein the adsorbent comprises a polystyrene/divinylbenzene adsorbent, a mixed cellulose ester adsorbent, or a hydrophobic zeolite adsorbent.

14. The method of claim 6 wherein the beer with increased foam stability comprises less than 1.5 mg/ml of the acetylated hydroxy fatty acid defined by structure 2.

15. The method of claim 6 wherein the beer with increased foam stability comprises less than 1.0 mg/ml of the acetylated hydroxy fatty acid defined by structure 2.

16. The method of claim 6 wherein the beer with increased foam stability comprises less than 0.5 mg/ml of the acetylated hydroxy fatty acid defined by structure 2.

17. The method of claim 6 wherein the beer with increased foam stability comprises less than 0.25 mg/ml of the acetylated hydroxy fatty acid defined by structure 2.

18. The method of claim 6 wherein the beer with increased foam stability comprises 0-15 vol. % ethanol.

19. The method of claim 6 wherein the beer with increased foam stability comprises a total of iso-alpha-acids of 5-55 mg/l.

20. The method of claim 6 wherein the beer with increased foam stability comprises a total sugar content, defined as the total of glucose, fructose, sucrose, maltose, and maltotriose, of 0.05-5 g/100 ml.

* * * * *